United States Patent
Lehmann et al.

(10) Patent No.: US 10,669,886 B2
(45) Date of Patent: Jun. 2, 2020

(54) COOLING DEVICE FOR COOLING PLATFORMS OF A GUIDE VANE RING OF A GAS TURBINE

(71) Applicant: Rolls-Royce Deutschland Ltd & Co KG, Blankenfelde-Mahlow (DE)

(72) Inventors: Knut Lehmann, Koenigs Wusterhausen (DE); Hamish Sweidan, Berlin (DE); Christian Kern, Rangsdorf (DE)

(73) Assignee: ROLLS-ROYCE DEUTSCHLAND LTD & CO KG, B (DE)

( * ) Notice: Subject to any disclaimer, the term of this patent is extended or adjusted under 35 U.S.C. 154(b) by 345 days.

(21) Appl. No.: 15/461,178

(22) Filed: Mar. 16, 2017

(65) Prior Publication Data
US 2017/0268380 A1    Sep. 21, 2017

(30) Foreign Application Priority Data

Mar. 17, 2016   (DE) .......................... 10 2016 104 957

(51) Int. Cl.
*F01D 25/12*       (2006.01)
*F01D 5/14*        (2006.01)
(Continued)

(52) U.S. Cl.
CPC ............. *F01D 25/12* (2013.01); *F01D 5/145* (2013.01); *F01D 9/041* (2013.01); *F23R 3/002* (2013.01);
(Continued)

(58) Field of Classification Search
CPC ........ Y02T 50/673; Y02T 50/676; F02C 7/12; F01D 25/12; F01D 5/046; F01D 5/145;
(Continued)

(56) References Cited

U.S. PATENT DOCUMENTS 2,859,934 A  * 11/1958  Halford ................... F01D 9/041
                                                                 415/115
3,670,497 A    6/1972  Sheldon
(Continued)

FOREIGN PATENT DOCUMENTS

DE       19813779 A1    9/1999
EP        1607580 A2   12/2005
(Continued)

OTHER PUBLICATIONS

European Search Report dated Jul. 17, 2017 for counterpart European Application No. 17160065.3.
(Continued)

*Primary Examiner* — George C Jin
*Assistant Examiner* — Teuta B Holbrook
(74) *Attorney, Agent, or Firm* — Shuttleworth & Ingersoll, PLC; Timothy J. Klima

(57) ABSTRACT

A cooling device for cooling platforms of a guide vane ring of a gas turbine is arranged downstream inside a main flow channel of a combustion chamber. Cooling air passages are arranged in a wall of the platforms or of an intermediate piece that is connected therewith to guide cooling air for film cooling the surfaces of the platforms. At least in certain areas, the wall is configured with at least two layers having—as viewed from the main flow channel—an outer wall and a spaced apart inner wall forming a hollow space, wherein the hollow space can be impinged by cooling air through at least one cooling air blow-in opening inside the outer wall, and at least one cooling air blow-out opening is arranged inside the inner wall extending in the downstream direction to the surfaces of the platforms.

17 Claims, 5 Drawing Sheets

(51) Int. Cl.
*F01D 9/04* (2006.01)
*F23R 3/00* (2006.01)

(52) U.S. Cl.
CPC .. *F05D 2220/32* (2013.01); *F05D 2220/3212* (2013.01); *F05D 2240/12* (2013.01); *F05D 2240/121* (2013.01); *F05D 2240/81* (2013.01); *F05D 2260/201* (2013.01); *F05D 2260/202* (2013.01); *F05D 2260/204* (2013.01); *F05D 2260/205* (2013.01); *F05D 2260/232* (2013.01); *F23R 2900/03042* (2013.01); *F23R 2900/03044* (2013.01); *Y02T 50/676* (2013.01)

(58) Field of Classification Search
CPC ........ F01D 9/041; F01D 9/02; F01D 2240/81; F05D 2240/81; F05D 2260/201; F05D 2260/205; F05D 2260/232; F23R 2900/03042; F23R 2900/03044; F23R 3/002
See application file for complete search history.

(56) References Cited

U.S. PATENT DOCUMENTS

| | | | | |
|---|---|---|---|---|
| 3,730,640 A * | 5/1973 | Rice | ............... | F01D 11/08 415/117 |
| 4,126,405 A * | 11/1978 | Bobo | ............... | F01D 9/042 415/115 |
| 4,821,522 A | 4/1989 | Matthews et al. | | |
| 4,889,469 A * | 12/1989 | Wilkinson | ............... | F01D 9/042 415/191 |
| 4,920,742 A * | 5/1990 | Nash | ............... | F01D 25/162 415/116 |
| 5,127,793 A * | 7/1992 | Walker | ............... | F01D 11/08 415/115 |
| 5,407,319 A * | 4/1995 | Harrogate | ............... | F01D 9/023 415/115 |
| 6,290,464 B1 * | 9/2001 | Negulescu | ............... | F01D 1/32 416/239 |
| 6,457,935 B1 * | 10/2002 | Antunes | ............... | F01D 11/008 415/115 |
| 7,000,406 B2 * | 2/2006 | Markarian | ............... | F01D 9/023 60/796 |
| 7,004,720 B2 * | 2/2006 | Synnott | ............... | F01D 9/041 415/115 |
| 7,527,469 B2 * | 5/2009 | Zborovsky | ............... | F01D 9/041 277/412 |
| 8,206,080 B2 * | 6/2012 | Howe | ............... | F01D 5/08 415/177 |
| 8,641,368 B1 * | 2/2014 | Liang | ............... | F01D 5/186 415/115 |
| 8,734,111 B2 * | 5/2014 | Lomas | ............... | F01D 5/187 416/193 A |
| 8,790,073 B2 * | 7/2014 | Mugglestone | ............... | F01D 9/041 415/115 |
| 9,243,508 B2 * | 1/2016 | Morgan | ............... | F01D 9/023 |
| 9,322,288 B2 * | 4/2016 | Burd | ............... | F16J 15/54 |
| 9,909,503 B2 * | 3/2018 | Salamon | ............... | F01D 11/001 |
| 2003/0026952 A1 * | 2/2003 | Fried | ............... | C23C 4/00 428/169 |
| 2004/0239050 A1 * | 12/2004 | Antunes | ............... | F01D 9/023 277/630 |
| 2005/0042077 A1 * | 2/2005 | Gekht | ............... | F01D 9/04 415/116 |
| 2006/0032233 A1 * | 2/2006 | Zhang | ............... | F01D 9/023 60/782 |
| 2006/0078417 A1 * | 4/2006 | Benton | ............... | F01D 9/023 415/115 |
| 2006/0263624 A1 * | 11/2006 | Jabado | ............... | B23K 1/0018 428/615 |
| 2007/0227119 A1 | 10/2007 | Alkabie | | |
| 2007/0283700 A1 * | 12/2007 | Gerendas | ............... | F23R 3/002 60/754 |
| 2009/0016881 A1 * | 1/2009 | Baldauf | ............... | F01D 5/22 416/95 |
| 2011/0067378 A1 * | 3/2011 | Tibbott | ............... | F01D 25/32 60/39.091 |
| 2016/0032764 A1 * | 2/2016 | Tibbott | ............... | F01D 9/047 415/116 |
| 2016/0069190 A1 * | 3/2016 | Spangler | ............... | F01D 9/065 60/806 |
| 2017/0016339 A1 * | 1/2017 | Winn | ............... | F01D 25/12 |
| 2017/0022829 A1 * | 1/2017 | Freeman | ............... | F01D 9/041 |
| 2017/0022836 A1 * | 1/2017 | Negulescu | ............... | F01D 5/081 |

FOREIGN PATENT DOCUMENTS

| | | |
|---|---|---|
| EP | 1731715 A1 | 12/2006 |
| EP | 1741877 A1 | 1/2007 |
| WO | WO2004038181 A1 | 5/2004 |

OTHER PUBLICATIONS

German Search Report dated Dec. 1, 2016 from counterpart German App No. 102016104957.3.

* cited by examiner

COOLING DEVICE FOR COOLING PLATFORMS OF A GUIDE VANE RING OF A GAS TURBINE

This application claims priority to German Patent Application DE102016104957.3 filed Mar. 17, 2016, the entirety of which is incorporated by reference herein.

The invention relates to a cooling device for cooling platforms of a guide vane ring of a gas turbine that is arranged downstream in a main flow channel of a combustion chamber according to the kind as it is more closely defined herein.

For the purpose of cooling the platforms of guide vanes that are arranged behind the ring-shaped gas discharge opening of the combustion chamber of a gas turbine and that form a guide vane ring with the inner and outer platforms, it is known from practice to guide cooling air to the platforms via the interface between the combustion chamber and the guide vane ring. Due to the axial and radial relative movements between these components, which are caused by the mechanical loads and thermal deformations as well as by the relatively long flow paths to the main gas flow surfaces of the platforms, a strong intermixing of cooling air with the hot gas flow of the combustion chamber occurs, so that the cooling effect on the platform surfaces and the formation of an effective cooling film on them are insufficient.

What is known from DE 198 13 779 A1 for cooling the platforms is an arrangement of guide vanes of a gas turbine that are arranged downstream of the ring-shaped discharge opening of a combustion chamber, wherein cooling air blow-out openings are provided in the combustion chamber discharge wall via which the cooling air can be transported into the hot gas flow to the platforms. Here, it can also be provided that cooling air blow-out openings are configured in the platform itself, with a specific arrangement criterion being applied.

Another kind of cooling the platforms of the guide vanes that are arranged behind the combustion chamber of a gas turbine is known from EP 1 607 580 A2, in which a platform cooling arrangement with cooling air blow-out channels is disclosed, which are arranged at least in part in a direction that is angled by a certain angle with respect to the circumferential direction in order to reduce the mixing of the cooling air flow with the hot gas flow by means of a suitable direction of the cooling air jet with respect to the platforms, as well as to achieve a higher concentration of cooling air in the end wall area and thus a more effective cooling of the platform surfaces.

However, there is the disadvantage that, depending on the design of the guide vane ring and its inner and outer platforms, the insertion of cooling air bores in the platform itself can often not be realized in the desired embodiment for manufacturing-technical reasons, for example with respect to the angle, special hole formations, and the like. Accordingly, in practice it is often not possible to also effectively use the cooling air that is blown in directly in front of the vane aerofoils of the guide vane ring through the platforms for the purpose of shielding the platforms from the hot gas due to the fact that it is intermixed with the hot gas flow to a high degree.

The invention is based on the objective to create a cooling device for cooling platforms of a guide vane ring of a gas turbine that is arranged downstream in a main flow channel of a combustion chamber of the above-mentioned kind, which facilitates an effective cooling, in particular a film cooling, in all surface areas of the platforms.

This objective is achieved in a cooling device for cooling platforms according to the features disclosed herein by configuring the wall of the platforms or of an intermediate piece that is connected with the same and arranged at the upstream-side or at the side of the combustion chamber of the platforms in such a manner that it has at least two layers with—as viewed from the main flow channel—an outer wall and an inner wall that is separated from the latter by a hollow space, wherein the hollow space is impinged by cooling air through at least one cooling air blow-in opening in the outer wall, and at least one cooling air blow-out opening is arranged inside the inner wall, extending in the downstream direction with respect to the surfaces of the platforms.

The invention makes it possible to guide the cooling air from an annular space of a secondary air area that surrounds the guide vane ring directly through the platforms of the guide vane ring to the surfaces of the platforms with an angle that is optimal for a film cooling of the surfaces, and at the same time to avoid any obstacles related to manufacturing technology at the desired angle guide of the cooling air blow-out opening to the surfaces of the platforms.

Thanks to the at least double-layered design of the wall of the platforms with a hollow space into which cooling air is inserted at high pressure through the cooling air blow-in openings and guided from there via at least one suitable slanted cooling air blow-out opening to the surfaces of the platforms, a highly efficient cooling of the surface of the platforms in an area that is located directly upstream in front of the vane aerofoils is facilitated independently of any restrictions due to manufacturing-technical reasons, which may require a differently angled arrangement of the at least one cooling air blow-in opening inside the hollow space. In other words, this means that the hollow space can be impinged with cooling air through cooling air blow-in openings that can be arranged in any manner in the outer wall that is facing away from the main flow channel with the hot gas, and that it can be deflected inside the same and blown out in the downstream direction with respect to the surfaces of the platforms through a cooling air blow-out opening that is designed optimally with respect to the cooling effect.

Here, at least one cooling air blow-out opening can extend in an oblique manner in the downstream direction in the axial as well as in the circumferential direction in accordance with the cooling requirements, wherein a continuous or discontinuous arrangement of the cooling air blow-out openings is possible in a plurality of cooling air blow-out openings, also with different orientations or angular arrangements.

In a simple embodiment of the invention, the hollow space can be configured integrally or in one piece with at least one of the platforms or the intermediate piece that is connected therewith at the side of the combustion chamber. Such a hollow space can be created by a corresponding core during the casting of the platforms or a corresponding intermediate piece, wherein the at least one cooling air blow-in opening and the at least one cooling air blow-out opening can be formed in the platform wall by means of suitable manufacturing methods, such as for example drilling or milling.

In the case that the hollow space is configured inside an intermediate piece which is connected to the platforms upstream or at the side of the combustion chamber and which may for example support a flap seal opposite the combustion chamber discharge opening in the possible case that it is arranged directly behind the combustion chamber, the hollow space can be formed by the outer wall and the inner wall of the intermediate piece as well as an axially upstream-side wall of at least one of the platforms, in particular one that extends in the radial direction. Thus, the hollow space is not formed only by the walls of the intermediate piece or of the platform, but rather through axially joining the two components, whereby the hollow space can be provided in a particularly simple manner from the manufacturing-technical point of view.

In particular if the hollow space is configured only at the platforms, it is advantageous if the inner wall that is facing towards the main flow channel is formed by a separate sheet metal type structural component. Such a separate structural component can be processed independently of the guide vane segments and their platforms, and facilitates an advantageous placement, number and angle guide as the cooling air blow-out openings are inserted or manufactured.

In the present case, the term "sheet metal type" is primarily to be understood in a geometrical sense, meaning a thin-walled, planar metal element, and does not imply a limitation to a certain manufacturing method. Thus, the sheet metal type structural component may be a rolled product as well as a cast product, for example.

Such a sheet metal type structural component that acts like a heat shield for shielding the platforms from hot air can be arranged at the outer wall in an area between the upstream-side end and the vane leading edge of the platforms by means of at least one attachment device using a force-fit, form-fit as well as a firmly bonded connection.

In a very advantageous embodiment, the sheet metal type structural component can alternatively or additionally be attached by means of at least one attachment device at an upstream-side end of wall across from the combustion chamber wall in the area of a seal, wherein this has the advantage that an attachment device that is usually already present can be used for attaching the seal at the platform wall at the same time as the attachment of the sheet metal type structural component is taking place. In this way, an additional retaining bolt for attaching the sheet metal type structural components can be omitted, for example.

Due to the main flow direction inside the gas turbine, an attachment of the sheet metal type structural component forming the inner wall at its upstream-side end opposite the outer wall—with the hollow space being thus configured—can be sufficient, in particular if the sheet metal type structural component is attached with a corresponding pre-stress.

Depending on the flow conditions and the dimensioning of the attachment device, it can be advantageous if the sheet metal type structural component is fixated at the outer wall with its downstream-side end. For this purpose, a form-fit connection can be provided, for example, which may be configured in a clip-type manner. Here, the downstream-side end of the sheet metal type structural component can have one or multiple recesses, which engage under an undercut at the respective platform in the radial direction.

Here, too, it can be advantageous if the sheet metal type structural component has a defined pre-stress after the mounting, correspondingly increasing the clip effect at the undercut.

However, depending on the configuration and the associated pre-stress after the mounting of the structural component, it can also be sufficient if the sheet metal type structural component simply rests with its downstream-side end at the inner side of the outer wall, wherein, for the purpose of configuring and ensuring the hollow space between the outer wall and the sheet metal type structural component, a superimposition element that preferably corresponds to the radial depth of the hollow space is provided at the sheet metal type structural component. This superimposition element can be configured in a rail-like manner or in the form of short webs with any geometry.

Due to fluid-mechanical reasons, it is advantageous if the inner contour of the structural components that are arranged upstream of the guide vane ring, such as for example of a combustion chamber wall, transition into the surface contour of the platforms in a manner that is as smooth or as aligned as possible, so that, in a preferred embodiment of the invention, the inner contour of the inner wall or of the sheet metal type structural component is configured so as to be at least approximately aligned with an inner contour of the structural components that are arranged upstream of the guide vane ring.

For this purpose, the outer wall in the area of the downstream-side end of the hollow space and in an upstream-side area directly in front of the vane aerofoils of the guide vane ring can in particular have an S-shaped cross-sectional curvature radially inward in the direction of the main flow channel, whereby the outer wall is expanded outwards in its outer circumference upstream of the inflow side of the vane aerofoils, and an installation space for the inner wall or the structural component is provided in this manner at the inner side of the outer wall. Thus, the structural component can be arranged in such a manner that, with respect to its inner contour, the inner wall is aligned at least approximately with the inner contour of the structural components that are arranged upstream of the guide vane ring, and that, at the same time, it is aligned with the outer wall that forms the surface of the platforms in the immediate area in front of the vane aerofoils through the S-shaped cross-sectional curvature.

For configuring the cooling air blow-in openings, a distance in the axial direction of the gas turbine between the sheet metal type structural component and the surfaces of the platforms in an upstream area directly in front of the vane aerofoils of the guide vane ring can be sufficient, wherein the corresponding downstream-side end of the sheet metal type structural component is configured preferably with such a radius or a bevel in the area between the hollow space impinged by cooling air and the downstream-side end of the inner surface of the sheet metal type structural component facing the flow channel, that it provides a desired cooling air inflow direction for the purpose of forming a film cooling on the platform surfaces. However, the at least one cooling air blow-out opening can also be formed in the inner wall by at least one bore or a clearing or recess, for example in the form of a slit with a central axis, with its expansion preferably extending in an angled manner inward towards the main flow channel in the downstream-side direction, namely in such a way that the cooling air that exits the cooling air blow-out opening forms a cooling film on the surfaces of the platforms at least in an area directly in front of vane aerofoils of the guide vane ring.

Due to manufacture-technical reasons, it is often the easiest option to insert cooling air blow-in openings towards the hollow space as bore holes or clearances or recesses in the upstream-side direction inward or radially in the direction of the main flow channel because of the outward curvature of the platforms that is usually provided upstream as viewed from the main flow channel, wherein the deflection of the cooling air is effected inside the hollow space.

If the inner wall of the platform wall is formed by a separate sheet metal type structural component, the latter can be configured as a circumferential ring as well as in the form of segments.

Even if it is not necessary in every embodiment, it can be advantageous with respect to the design of the sheet metal type structural component as a heat shield if the latter is manufactured from a high-temperature alloy and, if necessary, is configured with an additional heat-resistant coating at least at its inner surface that is impinged by the hot gas flow.

Other advantages and advantageous further developments of the invention follow from the patent claims and the exemplary embodiments that are described in principle by referring to the drawing.

Herein:

Figure 2:
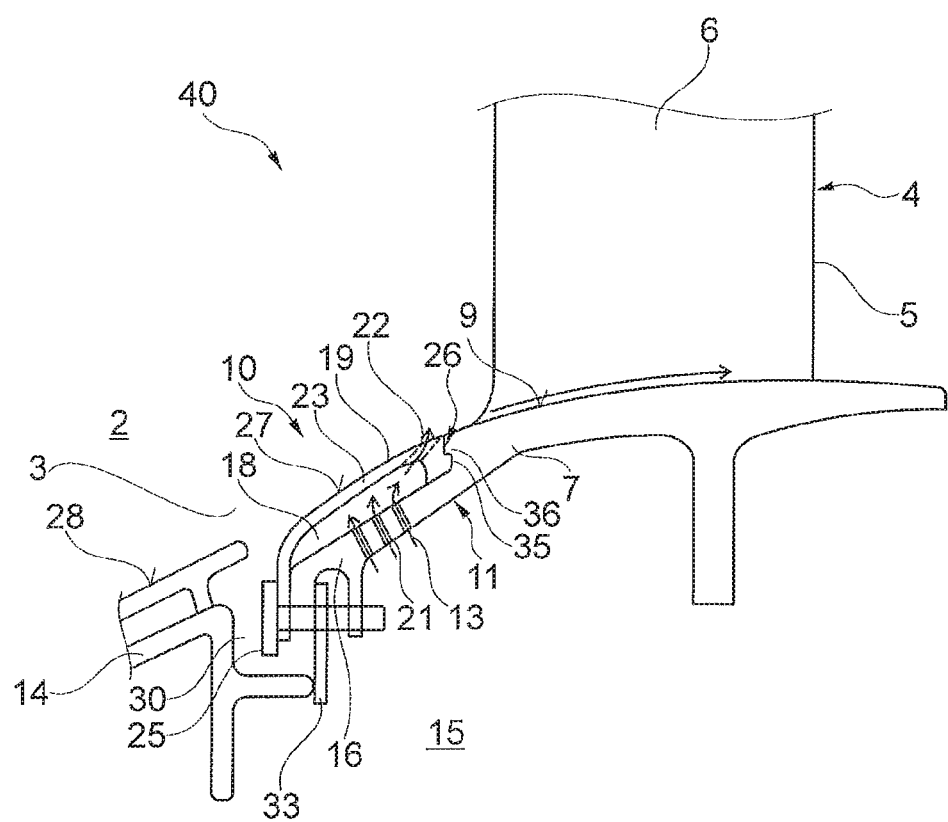
FIG. 2 shows a rendering of the transitional area between the combustion chamber and the guide vane ring that corresponds to a section of the partial view of FIG. 1, wherein the cooling device for the platforms of the guide vane ring has a sheet metal type structural component that is arranged and attached in an alternative manner with respect to the embodiment according to FIG. 1.
Figure 4:
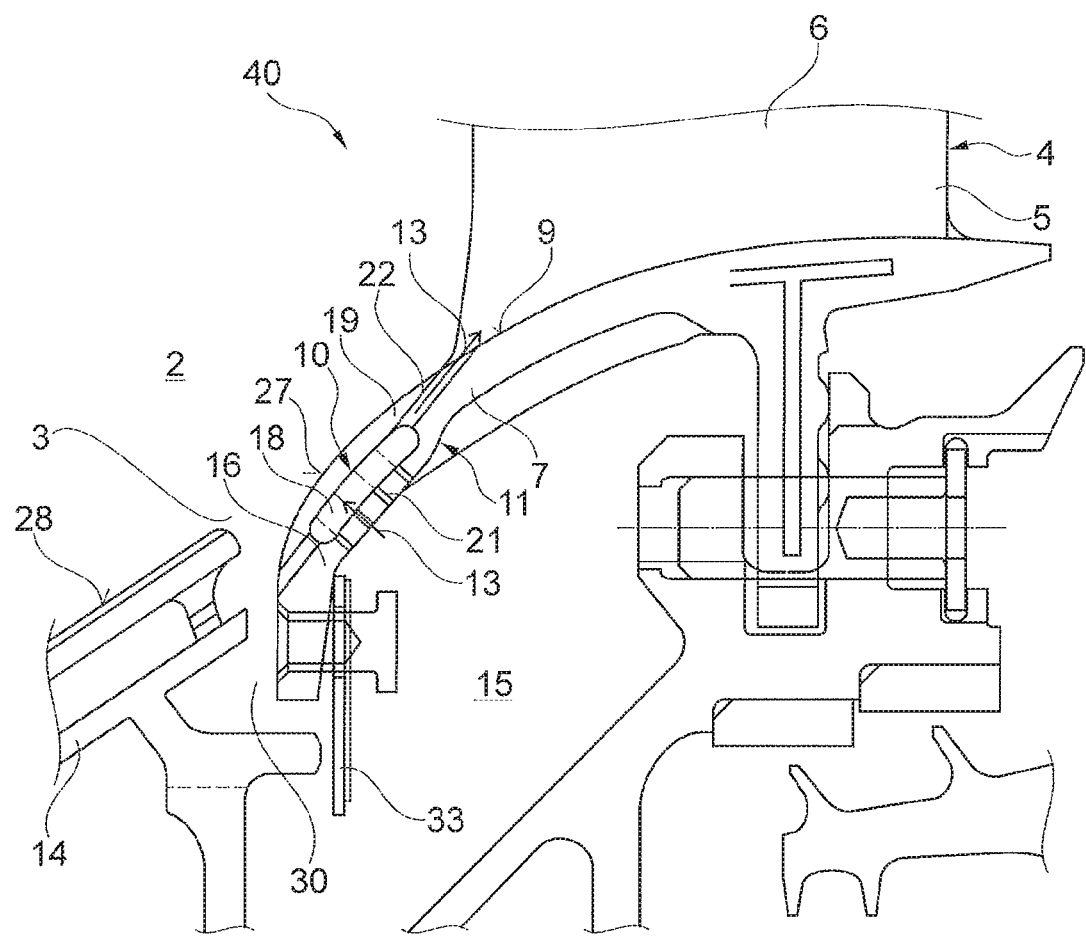
Figure 5:
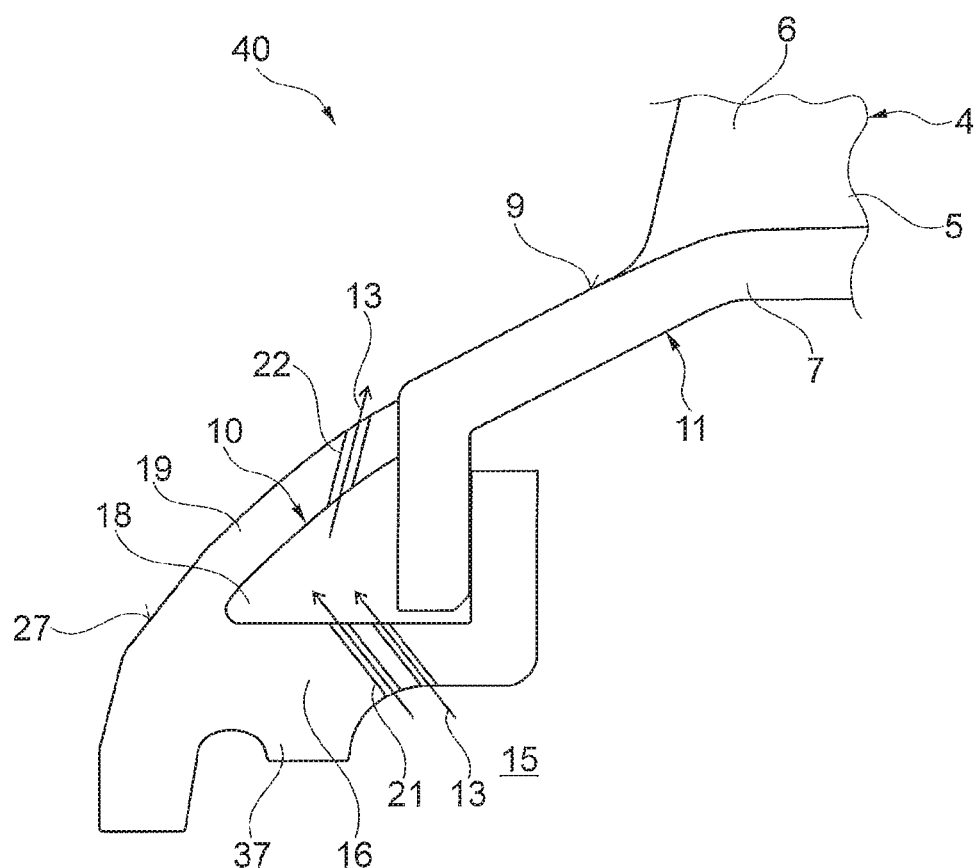

FIG. 4 shows a partial view of the interface between the combustion chamber and the guide vane ring corresponding to FIG. 2, with a cooling device that is formed integrally at the platforms; and FIG. 5 shows a strongly schematized sectional view of a platform of a guide vane with an intermediate piece that is connected at the side of the combustion chamber and that leads to the discharge opening of the combustion chamber, wherein the cooling device for cooling the platform surfaces has a hollow space that is formed between the walls of the intermediate piece and the platforms.

FIG. 1 to FIG. 5 respectively show a section of a gas turbine 1 that is configured as an aircraft turbine, in the present case with a combustion chamber 2 and a guide vane ring 4 that is arranged downstream of a discharge opening 3 of the combustion chamber 2 inside a main flow channel 40 and that is constructed in a segment-shaped manner with a plurality of guide vanes 5 in the circumferential direction, with the guide vanes 5 respectively having a vane aerofoil 6 between a radially inner platform 7 and a radially outer platform 8 between which they are supported in the known manner.

As has already been explained above, the surfaces 9 of the platforms 7, 8 that are facing towards the discharge opening 3 of the combustion chamber 2 have to be cooled because of the hot gas flow of the main flow channel 40 that is discharged through the discharge opening 3 of the combustion chamber 2. For this purpose, cooling air 13 is guided via a cooling device 10 from a secondary air area 15, which surrounds the combustion chamber 2 or a combustion chamber wall 14 and a wall 11, 12 of the platforms 7, 8, to the surfaces 9 of the platforms 7, 8 in an area directly upstream in front of an inflow side of the vane aerofoils 6 with a higher pressure than in the main flow channel 40 in order to achieve a film cooling at the surfaces 9 and a shielding of the platforms 7, 8 against the hot gas flow that is discharged from the combustion chamber 2. Since both the functional principle of the proposed cooling and the principal structure are analogous in the embodiments of FIG. 1 to FIG. 5, in the following the same reference signs are used for structural components having the same functionality in the different embodiments.

For the purpose of guiding cooling air 13 to the surfaces 9 of the platforms 7, 8, the cooling device 10 is designed in such a manner that, at least in certain areas, the wall 11, 12 of the platforms 7, 8 is configured with two layers having—as viewed from the main flow channel 40—an outer wall 16 or 17 and an inner wall 19 or 20 that is separated from the same by a hollow space 18. At least one cooling air blow-in opening 21 leads from the secondary air area 15 through the outer wall 16 or 17 into the hollow space 18. In turn, at least one cooling air blow-out opening 22 leads from the hollow space 18 in the downstream direction to the surfaces 9 of the platforms 7, 8 through the inner wall 19 or 20 the wall 11, 12 of the platforms 7, 8.

In the Figures, the number and the shape of the cooling air blow-in openings 21 and cooling air blow-out openings 22 is shown only in a symbolic manner, so that a divergent number of cooling air passage holes 21, 22 in different shapes, for example in the form of slits or round bores, and in the most different arrangements, which may be regular or irregular, grouped or isolated depending on the platform geometry, is also conceivable for achieving the desired film cooling.

Figure 1:
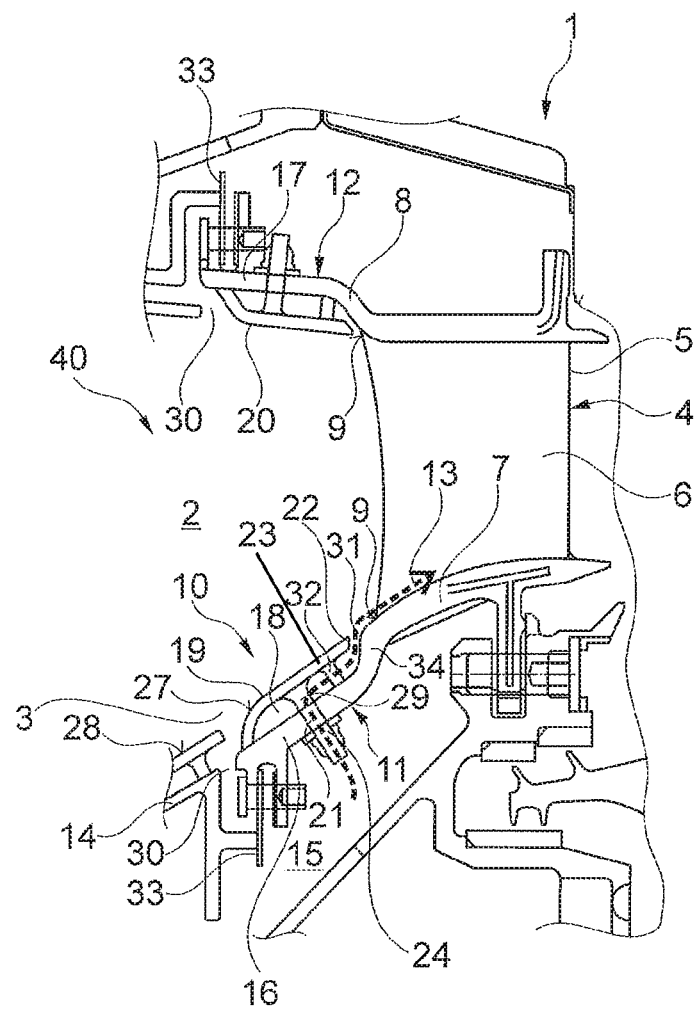
FIG. 1 shows a partial view of the combustion chamber of a gas turbine with a guide vane ring that is directly connected to the gas discharge opening and a cooling device for cooling the platforms of the guide vane ring with a separate, sheet metal type structural component that forms a heat shield.
Figure 3:
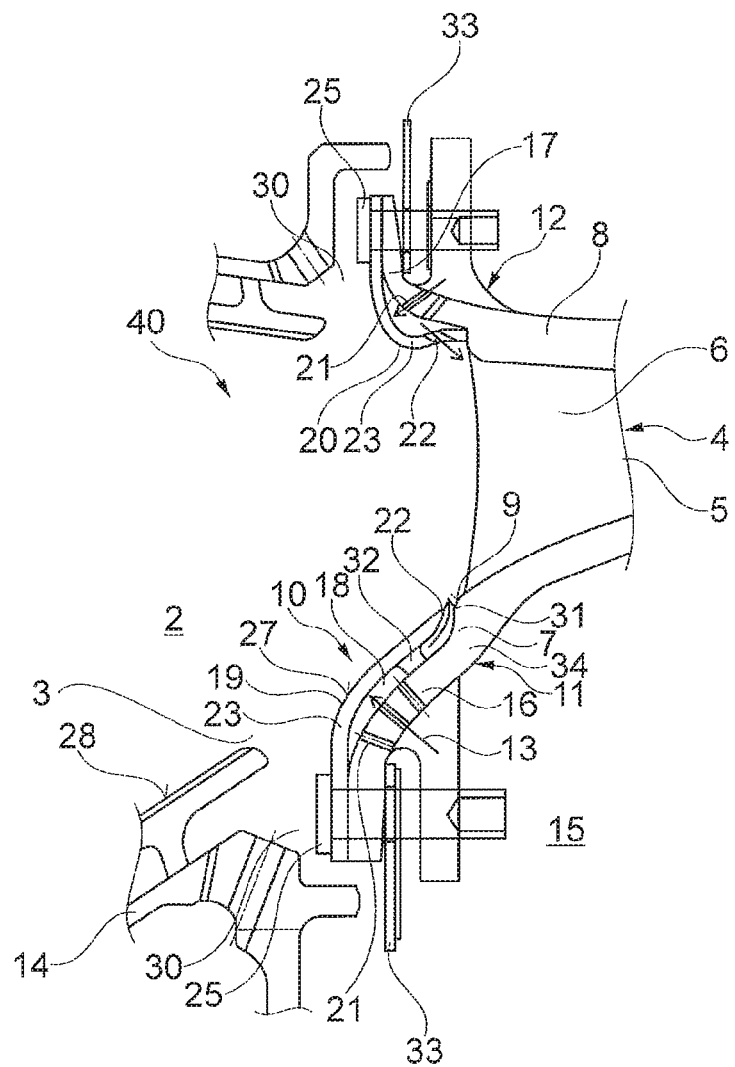
FIG. 3 shows a partial view of the combustion chamber and of the guide vane ring corresponding to FIG. 1, with two further alternative embodiments of the cooling device, respectively at the inner platforms and the outer platforms of the guide vane ring.

In the embodiments of the cooling device 10 that is shown in FIG. 1 to FIG. 3, an inner wall 19 or 20 of the wall 11, 12 of the platforms 7, 8 that is facing towards the hot gas is respectively formed by a separate, sheet metal type structural component 23 which is attached by means of at least one attachment device 24, 25, 26 at the outer wall 16 or 17 of the wall 11 or 12 of the platforms 7, 8. In every shown embodiment, the sheet metal type structural component 23 is configured as a heat shield made of a high-temperature alloy and has a surface curvature that is adjusted to the surface contour of the platforms 7, 8, wherein in the present case an inner contour 27 of the inner wall 19, 20 of the platforms 7, 8 or of the sheet metal type structural component 23 corresponds to an inner contour 28 of the combustion chamber wall 14 that is adjoining in the upstream direction. Here, the inner contour 28 of the combustion chamber wall can also be configured with a cooled heat shield in a manner analogous to the sheet metal type structural component 23 of the cooling device 10.

FIG. 1 shows an embodiment of the sheet metal type structural component 23, in which it has a retaining bolt 24 as the attachment device for fixation at the outer wall 16 or 17, with the retaining bolt 24 passing through the outer wall 16 or 17 and being configured so as to be hollow there, and also has passage openings 29 in the area of the hollow space 18, so that the retaining bolt 24 forms a cooling air blow-in opening 21 at the same time, via which the hollow space 18 can be impinged by cooling air from the secondary air area 15.

Of course, also further cooling air blow-in openings that are inserted by means of a bore through the outer wall 16 or 17 can be provided apart from the cooling air blow-in opening that is formed by the retaining bolt 24.

In the embodiment according to FIG. 1, the sheet metal type structural component abuts the outer wall 16 or 17 with its upstream-side end in the area of an interface 30 formed by a distance between the discharge opening 3 of the combustion chamber 2 and the guide vane ring 4, while the sheet metal type structural component 23 forms at least one cooling air blow-out opening at its downstream-side end through a distance 31 with respect to the surface 9 of the platforms 7, 8 which is positioned directly in front of the inflow side of the vane aerofoils 6 and in the area of which the sheet metal type structural component 23 is made to rest at the inner side of the outer wall 16 or 17 by means of a spacing or superimposition element 32 that corresponds to the radial depth of the hollow space 18.

In contrast to the embodiment according to FIG. 1, in the embodiment that is shown in FIG. 2, the sheet metal type structural component 23 is attached at the outer wall 16 in a different manner and is designed differently with respect to the cooling air blow-in openings 21 and the cooling air blow-out openings 22. The embodiment according to FIG. 2 shows a fixation of the sheet metal type structural component 23 at its upstream-side end by means of a retaining bolt 25 of a flap seal 33, which is provided in a per se known manner for creating a seal between the discharge opening 3 of the combustion chamber 2 and the platforms 7, 8 of the guide vane ring 4, and which can be tilted into a sealing position through the different pressure in the secondary air area 15 and the main flow channel 40. Through the dual use of the retaining bolt 25 of the flap seal 33, an additional retaining bolt can be saved as compared to the embodiment according to FIG. 1, and a more free arrangement of the cooling air blow-in openings 21 in the hollow space 18 can be facilitated.

In the embodiment according to FIG. 2, the sheet metal type structural component 23 is fixated at its downstream-side end to the platforms 7 or their surface 9 in a form-fit manner, wherein, just like in all generally advantageous designs that are shown in FIG. 1 to FIG. 3, the surface 9 of the platforms 7 transitions into the inner side of the outer wall 16 or 17 of the wall 11 or 12 of the platforms 7, 8 particularly due to an S-shaped cross-sectional curvature 34 in the direction facing away from the main flow channel 40, whereby an installation space for the creation of the hollow space 18 and the arrangement of the sheet metal type structural component 23 as the inner wall 19 or 20 is created.

The form-fit fixation of the sheet metal type structural component 23 in the embodiment shown in FIG. 2 is designed as a kind of clip connection, in which a recess 36 is clipped in the radial direction under an undercut 35 at the platforms 7 at the downstream-side end of the sheet metal type structural component 23.

Here, the cooling air blow-out openings 22 are inserted into the sheet metal type structural component in any number and in the present case so as to be beveled downstream, wherein here a central axis of the cooling air blow-out openings 22 that are embodied as bores or slits extends radially in the direction of the main flow channel 40 in the downstream-side direction so as to be angled in such a manner that the cooling air that exits from the respective cooling air blow-out opening 22 forms a cooling film in an area directly in front of the vane aerofoils 6 on the surfaces 9 of the platforms 7, 8. Here, too, the cooling air blow-in openings 21 are configured so as to extend in the upstream-side direction radially in the direction of the main flow channels 40 for reasons of easier manufacturability, so that the cooling air is also deflected inside the hollow space 18.

FIG. 3 shows two minor variations on the cooling device 10, in which the sheet metal type structural components 23 in the radially inner platforms 7 and in the radially outer platforms 8 again respectively use the retaining bolt 25 of the flap seal 33 as an attachment device. In the embodiment according to FIG. 3, the sheet metal type support elements 23 are embodied with such a high residual stress that they rest with their downstream-side end at the inner side of the outer wall 19 or 20 without any further attachment, and that they are spaced apart from it only through the superimposition element 32, with the hollow space 18 being formed.

As can be seen from FIG. 4, the hollow space 18 can also be configured integrally or in one piece with the platforms 7, 8, wherein it can be manufactured in the course of the casting process together with the platforms 7, 8. Just like in the other embodiments, the arrangement and configuration of the cooling air blow-in openings 21 and the cooling air blow-out openings 22 can be realized in any manner, for example by means of machining.

As shown in FIG. 5, the hollow space 18 can also be configured at an intermediate piece 37, which for example supports the flap seal 33 that is not shown here, and which forms a kind of axial extension of the platforms 7, 8 in the direction of the discharge opening 3 of the combustion chamber 2. If the surface 9 of the platforms 7, 8 has a correspondingly short axial extension in the area directly upstream in front of the vane aerofoils 6, an efficient film cooling can be achieved at the surface 9 of the platforms 7, 8 also in such an embodiment with an intermediate piece 37, in which the cooling air passage holes 21, 22 are much easier to insert into the platforms 7, 8 themselves from the manufacturing-technical perspective, as usual in a separate structural component.

REFERENCE SIGNS

1 gas turbine
2 combustion chamber
3 discharge opening of the combustion chamber
4 guide vane ring
5 guide vane
6 vane aerofoil
7 radially inner platform
8 radially outer platform
9 surface of the platform
10 cooling device
11 wall
12 wall
13 cooling air
14 combustion chamber wall
15 secondary air area
16 outer wall
17 outer wall
18 hollow space
19 inner wall
20 inner wall
21 cooling air blow-in opening
22 cooling air blow-out opening
23 sheet metal type structural component
24 attachment device, retaining bolt
25 attachment device, retaining bolt flap seal
26 attachment device
27 inner contour of the platform
28 inner contour of the combustion chamber
29 passage opening
30 interface
31 distance
32 superimposition element
33 flap seal
34 S-shaped cross-sectional curvature
35 undercut
36 recess
37 intermediate piece
40 main flow channel

The invention claimed is:

1. A cooling device for cooling a platform of a guide vane ring of a gas turbine that is arranged downstream inside a main flow channel of a combustion chamber, comprising:
a wall of the platform,
cooling air passages positioned in the wall through which cooling air for film cooling is guided to a surface of the platform,
wherein, at least in certain areas, the wall includes at least two layers, having—as viewed from the main flow channel—an outer wall and an inner wall that is spaced apart from the outer wall by a hollow space,
wherein the hollow space is impingeable by cooling air through at least one cooling air blow-in opening inside the outer wall,
wherein at least one cooling air blow-out opening is arranged inside the inner wall, extending in the downstream direction to the surface of the platform,
wherein at least one chosen from the at least one cooling air blow-in opening and the at least one cooling air blow-out opening is positioned upstream of an airfoil positioned on the platform, and
wherein the at least one cooling air blow-out opening is positioned between the inner wall and the outer wall.

2. The cooling device according to claim 1, wherein the inner wall is formed by a separate sheet metal structural component.

3. The cooling device according to claim 2, wherein the separate sheet metal structural component is attached at the outer wall by at least one attachment device.

4. The cooling device according to claim 2, wherein the separate sheet metal structural component is attached by at least one attachment device at an upstream-side end of the wall in the area of a seal opposite a combustion chamber wall.

5. The cooling device according to claim 4, wherein the attachment device is formed by a retaining bolt for attachment of the seal at the wall.

6. The cooling device according to claim 2, wherein the separate sheet metal structural component is fixated with a downstream-side end at the platform in a form-fit manner.

7. The cooling device according to claim 6, wherein the separate sheet metal structural component includes a portion that engages under an undercut at the platform.

8. The cooling device according to claim 2, wherein the separate sheet metal structural component rests at the inner side of the outer wall with its downstream-side end due to a defined pre-stress, wherein preferably a superimposition element that corresponds to the radial depth of the hollow space is provided at the separate sheet metal structural component.

9. The cooling device according to claim 2, wherein the separate sheet metal structural component is configured as a heat shield made of a high-temperature alloy.

10. The cooling device according to claim 9, wherein the separate sheet metal structural component includes an additional heat-resistant coating.

11. The cooling device according to claim 2, wherein the outer wall has an S-shaped cross-sectional curvature inwards against the main flow channel in an area of a downstream-side end of the hollow space and in an upstream-side area directly in front of vane airfoils of the guide vane ring, such that an inner side of the outer wall forms the surface in an area directly in front of the vane airfoils.

12. The cooling device according to claim 2, wherein a distance between the separate sheet metal structural component and the surface forms a cooling air blow-out opening in an upstream-side area directly in front of the vane airfoils of the guide vane ring.

13. The cooling device according to claim 1, wherein an inner contour of the inner wall is formed so as to at least approximately align with an inner contour of an adjoining structural component.

14. The cooling device according to claim 13, wherein the adjoining structural component is a combustion chamber wall.

15. The cooling device according to claim 1, wherein the at least one cooling air blow-in opening extends inward with respect to the main flow channel in an upstream direction, and the at least one cooling air blow-out opening extends inward with respect to the main flow channel in the downstream direction such that the at least one cooling air blow-out opening is angled such that the cooling air that is discharged from the at least one cooling air blow-out opening forms a cooling film on the surface of the platform in an area directly in front of airfoil.

16. The cooling device according to claim 15, wherein the at least one cooling air blow-in opening is a bore or a slit and the at least one cooling air blow-out opening is a bore or a slit.

17. The cooling device according to claim 1, wherein that the inner wall is connected to and engages the platform.

* * * * *